United States Patent [19]

Winningham

[11] 3,733,787
[45] May 22, 1973

[54] METHOD, APPARATUS AND SYSTEM FOR SEPARATING PARTICULATE MATTER FROM GASES LADEN THEREWITH AND ACCUMULATING THE PARTICULATE MATTER

[75] Inventor: Truman Winningham, Monta Vista, Calif.

[73] Assignee: Truman Smog Control, Inc., San Francisco, Calif.

[22] Filed: Jan. 31, 1972

[21] Appl. No.: 222,228

[52] U.S. Cl. .................. 55/228, 55/227, 55/229, 55/247, 261/29, 261/70, 261/93
[51] Int. Cl. ............................................. B01d 47/00
[58] Field of Search ................... 55/230, 227, 228, 55/229, 231, 244, 247, 255, 256, 84, 86, 95; 261/29, 70, 93, 83, 84

[56] References Cited

UNITED STATES PATENTS

| 1,032,536 | 7/1912 | Gerli et al. | 261/93 |
| 2,177,665 | 10/1939 | Loughrey | 55/247 X |
| 2,216,664 | 10/1940 | Fremd, Jr. | 55/256 X |
| 2,721,065 | 10/1955 | Ingram | 55/256 X |
| 3,224,170 | 12/1965 | Iwanaga et al. | 261/77 X |

FOREIGN PATENTS OR APPLICATIONS

| 1,363 | 1907 | Great Britain | 55/247 |

Primary Examiner—Dennis E. Talbert, Jr.
Attorney—Thomas E. Schatzel and Claude A. S. Hamrick

[57] ABSTRACT

A method, apparatus and system for separating particulate matter from gases laden therewith and for accumulating the particulate matter including apparatus for separating the particulate matter from the gases. The gas-particulate matter separating apparatus comprises means forming a first chamber adapted to receive a quantity of separating liquid having a predetermined specific gravity and having a gas inlet port in an upper portion thereof; means forming a second chamber adapted to receive a quantity of said separating liquid and having a gas exit port in an upper portion thereof; means forming a liquid conveyor passage communicating an intermediate portion of said first chamber with an intermediate portion of said second chamber; a sludge discharge port communicating with the lower portion of said second chamber; and conveyor means operative to mix particulate matter and gases entering said first chamber through said gas inlet port with liquid in said first chamber and to convey said mixture through said liquid conveyor passage into said second chamber wherein the gases and particulate matter are gravity separated with the gases exiting through said gas exit port and the particulate matter precipitating toward the bottom of said second chamber and toward said sludge discharge port.

7 Claims, 4 Drawing Figures

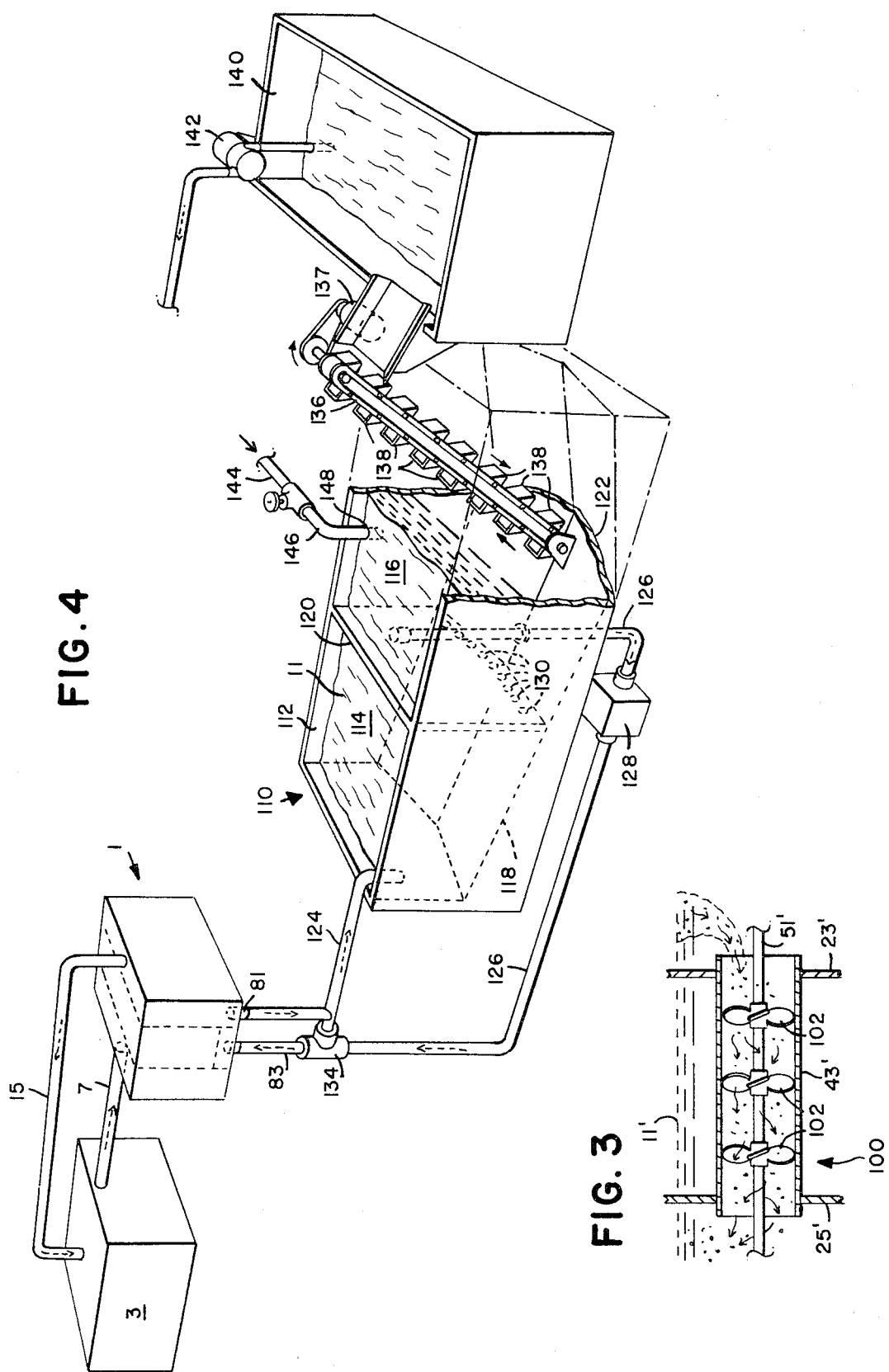

METHOD, APPARATUS AND SYSTEM FOR SEPARATING PARTICULATE MATTER FROM GASES LADEN THEREWITH AND ACCUMULATING THE PARTICULATE MATTER

BACKGROUND OF THE INVENTION

The present invention relates to a method, apparatus and system for separating particulate matter from gases laden therewith and for accumulating the particulate matter.

There are various industrial, commercial and other applications in which surrounding air becomes polluted with dust particles thereby making the air undesirable for discharge to the environment of living plants and animals. Examples include cement sacking industries in which the powder cement is packaged in sacks in sacking rooms. The surrounding air within the sacking room and about the equipment becomes highly polluted and undesirable for discharge to the environment about living plants and animals. Other applications include chemical industries in which powdered chemicals are processed in their dry state. There are various other manufacturing facilities in which the air becomes contaminated and polluted with soot. Environmental control makes it desirable to separate the particulate matter from the air prior to discharging the air to the environment. It is further desirable to accumulate the particles for further use or disposal.

Heretofore, various processes and apparatus have been suggested for the treatment of dust laden air. Such approaches have, in the most part, proven to be complex, costly and frequently inefficient. The prior art includes U.S. Pat. No. 940,141 and U.S. Pat. No. 2,795,288 which relate to dust separating tanks. Other patents of interest include U.S. Pat. No. 1,363,331 relating to an air cleaner for vehicles operated in dust laden atmospheres and U.S. Pat. No. 2,980,206 relating to a gas scrubber apparatus.

SUMMARY OF THE INVENTION

The present invention describes a method, system and apparatus for cleaning gases polluted with particles. The method comprises the steps of mixing the gas, e.g., dust laden air with a separating liquid of a predetermined specific gravity within an air cleaning apparatus to form a mixture of the air, dust particles and separating liquid. A sludge is formed by the dust particles and separating liquid which sludge has a specific gravity exceeding that of the separating liquid. The sludge and air are discharged in a gas-sludge separating compartment wherein the air and sludge separate. The air is then discharged through a supply of the separating liquid within the separating compartment and then to the environment. The sludge is directed through the separating liquid in the separating compartment and then directed from the air cleaning apparatus to a sludge separating means to remove excess quantities of the separating liquid from the accumulated dust particles. After separation, the separating liquid may then be recycled from the sludge separating means to the air cleaning apparatus for reuse in the process. The accumulated dust particles may be dried or otherwise processed for further use.

An exemplary embodiment of the system as utilized for cleaning dust laden air includes apparatus for cleaning the air of the dust particles and includes a container means baffled into a plurality of compartments positioned in tandem. The dust laden air is received in a first compartment. The first compartment contains a supply of separating liquid, e.g., water. The dust laden air is drawn through the water within the first compartment to the input of a conveyor tunnel means extending to a second compartment. The dust laden air and liquid are drawn through the conveyor or tunnel means to establish a mixture of the air, dust and separating liquid. The mixture is discharged from the tunnel conveyor means into the second compartment which also carries a supply of separating liquid having a specific gravity less than that of the sludge. Discharge from the conveyor tunnel means occurs at a submerged level such that the air ascends through the separating liquid within the second compartment towards the liquid surface and a sludge, formed by the accumulated dust particles and liquid, descends through the separating liquid towards the bottom of the second compartment. The sludge is then discharged from the apparatus through a sludge discharge port and the air is discharged from the apparatus through an air discharge port. Above the liquid surface level, the first compartment is enclosed relative to the second compartment so as to minimize mixture of the exhaust air with the input air.

The system further includes a sludge separating means for receiving sludge discharged from the air cleaning apparatus. Said separating means and air cleaning apparatus are interconnected by tunnel means to permit the sludge to flow intermediate thereof. The sludge separating means includes a settling tank with separating liquid. The settling tank is adapted such that the accumulated dust particles of the sludge descend to the bottom as received from the air cleaning apparatus. A portion of the separating liquid is recycled to the air cleaning apparatus and a portion of the separating liquid is injected in the tunnel means and directed towards the separating means to provide a moving force to urge the sludge discharged from the apparatus towards said separating means. A sludge removal means is engaged to the separating means to remove the settled sludge from said separating means.

BRIEF DESCRIPTION OF THE DRAWINGS

FIG. 3 is a sectioned view of an alternate embodiment of conveyor of the apparatus of FIG. 1; and FIG. 4 is a diagrammatic illustration of a system in accordance with the present invention.

DETAILED DESCRIPTION OF THE PREFERRED EMBODIMENTS

Figure 1:
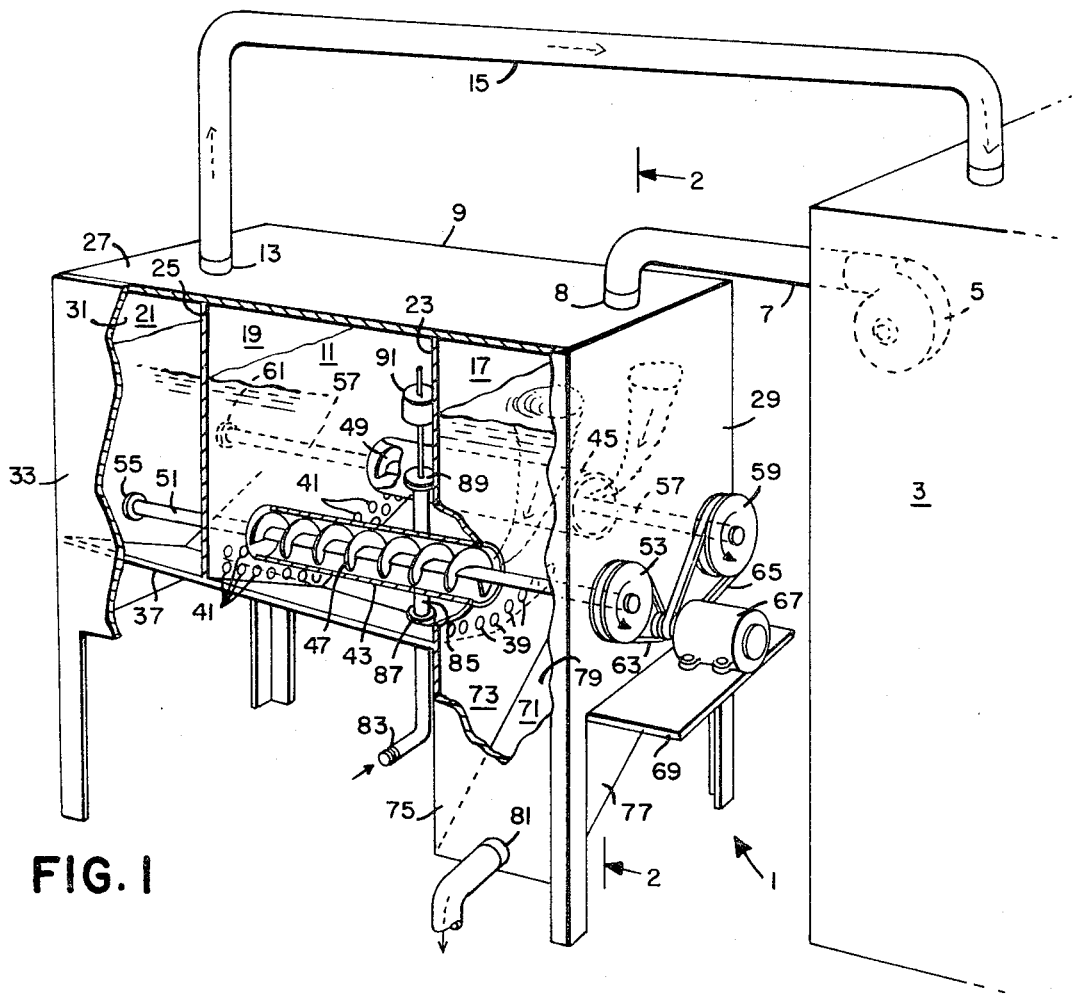
FIG. 1 is a perspective, partially sectioned view of apparatus for cleaning dust laden air in accordance with the present invention.
Figure 2:
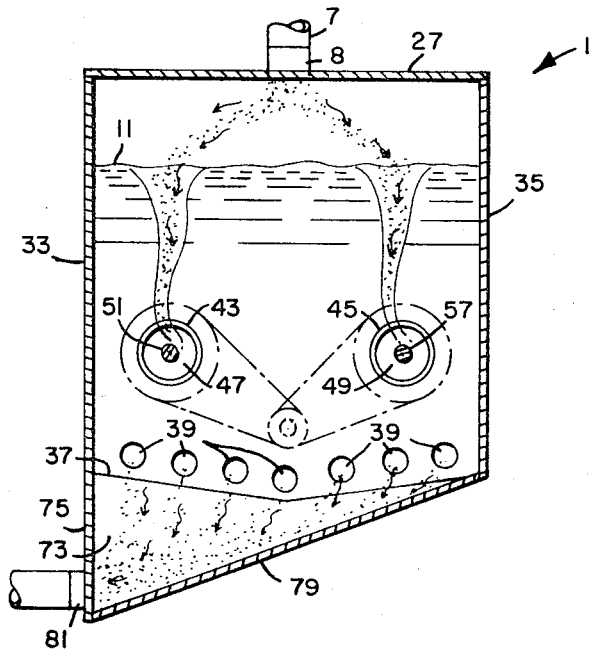
FIG. 2 is an end section view of the apparatus of FIG. 1 taken along the line 2—2.

FIGS. 1 and 2 illustrate apparatus, referred to by the general reference character 1, for cleaning dust laden air. The dust laden air may be created in a factory or other environment, e.g., a sacking room 3 of a dry cement manufacturing facility. The dust laden air from the room 3 is exhausted from the room 3 by means of a blower 5 through an air duct 7. The duct 7 is joined to an air input passage 8 joined to a tank means 9 of the apparatus 1. The tank 9 carries a supply of separating liquid 11 in the form of water. The relative position of the air input portal 8 and level of the liquid 11 is such that the air enters the tank 9 above or near the top of the liquid level surface. The input air is mixed with the separating liquid 11 in the tank 9 to form a sludge of the liquid and dust particles. The air is separated from the sludge and directed through a clean air exhaust passage 13. The passage 13 is coupled to a clean air return duct 15 and the air recycled to the sacking room 3.

The tank 9 of the apparatus 1 is baffled into three enclosed compartments 17, 19 and 21. A vertical partition wall 23 separates the compartment 17 and 19 and a vertical partition wall 25 separates the compartments 19 and 21. The tank 9 carries a top wall 27 coupled to the input passage 8 and exhaust passage 13. The tank 9 is further formed by means of a pair of end walls 29 and 31, a pair of side walls 33 and 35, and a tapered bottom wall 37. The bottom wall 37 is descendly tapered from the side walls 33 and 35 towards the middle and descendly tapered from the end wall 31 towards the end wall 29. The partition walls 23 and 25 and cover 9 serve to isolate the compartments 17 and 21 relative to one another, in turn discouraging mixing of the input air and exhaust air within the tank 9 above the liquid surface. A plurality of apertures 39 are formed in the wall 23 adjacent to the bottom wall 37 and a plurality of apertures 41 are formed in the wall 25 adjacent to the bottom wall 37. The apertures 39 and 41 provide means for the discharge of sludge from said second and third compartments 21 and 19 to the first compartment 17. The air above the liquid level within each of the compartments 17, 19 and 21 remains substantially segregated from one another.

Within the center compartment 19 is a conveyor means including a pair of right cylinder tubes 43 and 45. Each of the cylinders 43 and 45 open to the first compartment 17 through the partition wall 23 and open to the third compartment 21 through the partition wall 19. Within the cylinders 43 and 45 respectively, are a pair of conveyor screws 47 and 49. The screw 47 is joined to a shaft 51 which extends through the end wall 29 and is coupled to a pulley 53. The shaft 51 is journaled to a journal member 55 supported by the end wall 31. The conveyor screw 49 is engaged to a shaft 57 which extends through the end wall 29 and is coupled to a pulley 59. The shaft 57 extends to the end wall 31 and is journaled to a journal 61. The pulleys 53 and 59 are respectfully engaged to a pair of drive belts 63 and 65. The belts 63 and 65 couple the pulleys 53 and 59 respectively to the drive pulley of a drive motor 67. Pulleys 53 and 59 are of larger diameter than the drive pulleys of the motor to reduce the rotational velocity of the shafts 51 and 57 relative to that of the motor 67. The drive motor 67 is supported by a platform 69 secured about the exterior of the end wall 29.

The bottom area of the compartment 17 extends to a tapered trough 71. The trough 71 has a side wall 73 engaged at substantially right angles to the bottom wall 37. The tank side wall 33 carries a wall extension 75 which extends below the bottom wall 37 and is engaged at right angles to the side wall 73. The end wall 29 has a wall extension 77 which extends below the bottom wall 37 and is engaged at substantially right angles to the segment 75. The trough 71 carries a tapered bottom wall 79. Adjacent to the intersection of the bottom wall 79 and the extension 75 is a sludge discharge portal 81 positioned to permit exit of the sludge from within the trough 71.

The separating liquid 11 which may be in the form of water enters the center compartment 19 by means of an inlet portal 83. The portal 83 is coupled to a standing pipe 85 extending within the compartment 19 through the bottom wall 37. A coupling seal 87 secures and seals the pipe 85 about the bottom wall 37. Regulation of the incoming separating liquid to the compartment 19 is accomplished by means of a float valve 89 affixed to the end of the pipe 85. The valve 89 includes a float 91 for sensing the liquid level within the compartment 19 and for retaining the liquid level below a predetermined maximum level. The liquid level within the three compartments 17, 19 and 21 remains substantially equal relative to one another by means of the apertures 39 and 41.

In operation, the motor 67 drives the pulleys 53 and 59 in turn rotating the conveyor screws 47 and 49 respectively. The dust laden air enters the compartment 17 by means of the duct 7 and dust laden air input portal 8. Within the compartment 17, the air is drawn through the separating liquid 11 to the interior of the cylinders 43 and 45. A portion of the dust particles precipitate to the trough 71 and a portion enters the cylinders 43 and 45. The air, dust particles and liquid within the cylinders 43 and 45 is pumped through the cylinders to establish a mixture of the dust, air and separating liquid. The mixture exits the tubes 43 and 45 within the compartment 21. Within the compartment 21, the air, having a specific gravity less than that of the liquid, ascends through the separating liquid to the surface of the liquid and exits through the exhaust portal 13 and duct 15. The air is further separated from dust particles as the air ascends through the liquid 11. The duct 15 directs the air back to the sacking room 3. The compartment 19 tends to function as a buffer zone to further isolate the input air from the air exhaust. The sludge created by the mixture of the dust particles and separating liquid, and having a specific gravity exceeding that of the liquid, descends towards the bottom surface 37 within the compartment 21. The taper of the bottom wall 37 permits gravitational force to urge the sludge through the apertures 41 of the petition wall 25. The sludge tends to slide along the tapered wall 37 through the apertures 39 of the partition wall 23 and into the tapered trough 71 at the bottom of the compartment 17. The accumulated sludge then exits through the sludge discharge portal 81. As the sludge, comprising the mixture of the separating liquid and dust, exits through the discharge portal 81, the level of separating liquid within the tank 9 is maintained constant by means of the incoming liquid through the pipe 85 and through the valve 89.

FIG. 3 illustrates an alternative embodiment for the conveyor means within the apparatus 1. Those elements of FIG. 3, common to the apparatus 1 of FIGS. 1 and 2, carry the same reference numeral distinguished by a prime designation. The conveyor of FIG. 3, referred to by the general reference character 100, is in the form of a propeller with a plurality of propellor blades 102 mounted on the shaft 51' within the cylinder 43'. The propellers 102 are adapted to urge and convey the mixture of air, liquid and dust along the tube 43' from the compartment 17' to the compartment 21' of the tank 9. As in the apparatus 1, a plurality of conveyors 100 may be inserted within the tank 9 depending upon the desired capacity of air to be cleaned and dust particles to be accumulated.

FIG. 4 illustrates a system including the apparatus 1 to accumulate and separate the dust particles from the air and a sludge separating means, referred to by the general reference character 110, to separate the accumulated dust from the separating liquid of the sludge. The sludge separating means 110 includes a sludge settling vat 112 baffled into two sections 114 and 116. The sections 114 and 116 are formed by a bottom wall 118 descendly tapered towards the middle and descendly tapered from the section 114 to the section 115 and a vertical partition wall 120. The section 116 further carries a tapered end wall 122 for purposes hereinafter discussed. A tunnel 124 extends from the sludge discharge portal 81 of the apparatus 1 to the section 114 of the vat 112 to permit sludge to be transported from the apparatus 1 to the vat 112. A return tube 126 extends from the interior of the section 116 of the vat 112 to the pipe 83 of the apparatus 1. A pump 128 is engaged to the tube 126 to pump separating liquid from the vat 112 towards the apparatus 1.

In operation, sludge is exited through the sludge exit portal 81 of the apparatus 1 and is transported through the tunnel 124 to the vat 112. The sludge is discharged from the tunnel 124 near the surface of the separating liquid within the section 114. The accumulated dust particles of the sludge tend to descend within the section 114 through the separating liquid 11 towards the bottom wall 118. The partition wall 120 includes a plurality of apertures 130 adjacent to the bottom wall 118 to permit sludge within the vat 112 to penetrate from the section 114 to the section 116. The taper of the wall 118 and gravitational force causes the accumulated sludge and dust particles to migrate through the apertures 130 of the wall 120 to within the section 116. The separating liquid 11 from the sludge is encompassed within the section 116 and exits near the upper surface through the tube 126 and travels back towards the apparatus 1. The pump 128 increases the pressure of the liquid. The liquid re-enters the apparatus 1 through the portal 83. Adjacent to the portal 83 is a T-type jet 134 such that part of the separating liquid may be redirected to the tunnel line 124 to provide a moving force to the sludge exiting through the portal 81 toward the vat 112. The control valve 89 within the section 19 of the apparatus 1 controls the level of separating liquid that is permitted to enter through the portal 83. The jet 134 further provides for pressure release for the pump 128 in the event the separating liquid 11 within the tank 9 attains a level at which the valve 89 closes thereby blocking passage of liquid from the piping 126 within the tank 11.

As the sludge accumulates within the settling vat 112 about the intersection of the tapered bottom wall 118 and the tapered wall 122, it is removed by means of a conveyor belt 136. The conveyor belt 136 is continuously driven in a rotary motion by a motor 137. The conveyor belt 136 carries a plurality of individual cups 138 to collect the sludge from the vat 112 and transport the sludge to a collection center 140. The collection center 140 may be in the form of a permanent stationary center or a mobile center in the form of a truck or other transport equipment. A pump 142 may be engaged to the center 140 to remove excess separating liquid as desired.

In operation, it is desirable to retain the separating liquid level 11 within the vat 112 at a substantial height so as to enhance separation of accumulated dust particles from the liquid and to enhance the cleanliness of the water pumped back through the tube 126. In the event the amount of liquid entering through the tunnel 124 is not sufficient to retain the desired liquid level, an auxiliary water supply 144 may be utilized. The supply 144 is connected to a piping 146 and to a float control valve 148 to control the amount of auxiliary water entering the vat 112.

What is claimed is:

1. Apparatus for cleaning dust laden air comprising, in combination:
   a container means for receiving a body of separating liquid, said container means including a first, second and third compartment with said third compartment intermediate said first and second compartments, said first compartment being enclosed relative to said second compartment above the liquid surface level, and adapted to receive dust laden air;
   a conveyor means enclosed within a pipe means extending intermediate said first and second compartments, said pipe means opening to said first compartment and to said second compartment, the conveyor means being adapted to draw dust laden air and liquid from said first compartment and to pump aid resultant mixture of air, liquid and dust to within said second compartment;
   an air exit portal extending from the container means for passing air from said second compartment;
   first aperture means extending intermediate said first compartment and third compartment to permit passage of separating liquid and sludge intermediate said first and third compartments;
   second aperture means extending intermediate said second and third compartments to permit passage of separating liquid and sludge intermediate said second and third compartments; and
   a sludge outlet portal about the container means for passing sludge from said second compartment.

2. The apparatus of claim 1 in which
   the conveyor means is in the form of a conveyor screw extending intermediate said first and second compartments; and including
   drive means for imparting motion to said conveyor means.

3. The apparatus of claim 1 in which
   the sludge outlet portal is positioned at a gravitational level lower than the opening of said conveyor means at said second compartment; and the tank means includes
   a tapered bottom wall tapered from said second compartment at an angle towards the sludge outlet portal.

4. The apparatus of claim 3 in which the container means includes
   a first partition wall separating said first and said third compartments and a second partition wall separating said second and third compartments.

5. The apparatus of claim 4 in which
   said second aperture means is in the form of apertures within said second partition wall at a gravitational level lower than the opening of said conveyor means at said second compartment; and
   said first aperture means is in the form of apertures within said first partition wall at a gravitational level lower than the opening of said conveyor means at said first compartment.

6. The apparatus of claim 5 in which the sludge outlet portal opens within said first compartment about said bottom wall.

7. A system for cleaning dust laden air of dust particles and accumulating the dust particles, the system comprising, in combination:
- a container means for receiving a body of separating liquid, said container means including at least a first, second and third compartment, said first compartment including an air input portal for receiving dust laden air;
- a conveyor means within said second compartment and extending intermediate said first and third compartments, said conveyor means opening to said first compartment and to said third compartment, the conveyor means being adapted to draw dust laden air and liquid from said first compartment and to deliver said resultant sludge and air to within said third compartment;
- an air exit portal extending to said third compartment for passing air from said third compartment;
- a sludge outlet portal about the bottom of the tank means for passing sludge from said third compartment;
- means forming a sludge passage extending from the sludge outlet portal for directing passage of sludge from said sludge outlet portal;
- a sludge settling vat engaged to said sludge passage to receive sludge from the sludge passage, the sludge settling vat being adapted to receive a supply of separating liquid;
- piping means for removing liquid from the settling tank and directing said removed liquid to the container means;
- pump means engaged with said piping means to increase the pressure of the liquid removed from the settling vat;
- interconnect means interconnecting said piping means and said passage means adjacent to the sludge outlet portal, said interconnect means being positioned to direct at least a portion of said liquid within said passage means towards the sludge settling vat;
- sludge removal means for removing sludge from the settling vat.

* * * * *